(12) United States Patent
Yokoyama

(10) Patent No.: US 9,222,357 B2
(45) Date of Patent: Dec. 29, 2015

(54) BIT EXCHANGE METHOD AND BIT EXCHANGE DEVICE FOR SHIELD TUNNELING MACHINE

(75) Inventor: Mitsuhisa Yokoyama, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 17 days.

(21) Appl. No.: 14/371,852

(22) PCT Filed: May 25, 2012

(86) PCT No.: PCT/JP2012/063419
§ 371 (c)(1),
(2), (4) Date: Jul. 11, 2014

(87) PCT Pub. No.: WO2013/111359
PCT Pub. Date: Aug. 1, 2013

(65) Prior Publication Data
US 2014/0357461 A1    Dec. 4, 2014

(30) Foreign Application Priority Data
Jan. 24, 2012   (JP) ................................. 2012-011595

(51) Int. Cl.
*E21D 9/08* (2006.01)
*E21D 9/10* (2006.01)
*B23Q 3/155* (2006.01)

(52) U.S. Cl.
CPC ................ *E21D 9/081* (2013.01); *B23Q 3/155* (2013.01); *E21D 9/087* (2013.01); *E21D 9/104* (2013.01); *Y10T 483/10* (2015.01); *Y10T 483/1738* (2015.01)

(58) Field of Classification Search
CPC ....................................................... E21D 9/104
See application file for complete search history.

(56) References Cited

U.S. PATENT DOCUMENTS

| | | | |
|---|---|---|---|
| 5,421,422 A * | 6/1995 | Crane | E21D 9/104 |
| | | | 175/363 |
| 6,347,838 B1* | 2/2002 | Mukaidani | E21D 9/104 |
| | | | 299/55 |
| 8,523,288 B2 | 9/2013 | Hanaoka et al. | 299/56 |
| 2013/0045055 A1* | 2/2013 | Derycke | E21D 9/104 |
| | | | 405/138 |

FOREIGN PATENT DOCUMENTS

| | | | | |
|---|---|---|---|---|
| JP | 2000-096987 | | 4/2000 | ................ E21D 9/08 |
| JP | 2001-027097 | | 1/2001 | ................ E21D 9/08 |

(Continued)

OTHER PUBLICATIONS

International Search Report for International Application No. PCT/JP2012/063419, Aug. 28, 2012.

*Primary Examiner* — John Kreck
(74) *Attorney, Agent, or Firm* — Kusner & Jaffe

(57) ABSTRACT

Sealing in the sliding gap of a rotating valve is improved to smoothly rotate the rotating valve during replacement of a roller bit. A valve housing portion is formed behind a bit housing portion having an opening at the front of a main cutter spoke. A rotating valve is rotationally disposed as a rotating body in the valve housing portion. A bit case containing the roller bit is moved into the bit housing portion so as to protrude from a removable passage of the rotating valve, and then the bit case is fixed by a cotter member to support a drilling reaction force. Thus, the sliding gap of the rotating valve is disposed in the bit housing portion and the valve housing portion and is covered with the bit case.

6 Claims, 9 Drawing Sheets

(56) References Cited

FOREIGN PATENT DOCUMENTS

| JP | 2003-253989 | 9/2003 | ............... E21D 9/08 |
| JP | 2004-211477 | 7/2004 | ............. E21D 9/087 |
| JP | 3139749 | 2/2008 | ............. B41J 25/308 |
| JP | 2008-063801 | 3/2008 | ............. E21D 9/087 |
| JP | 4163965 | 8/2008 | ............. E21D 9/087 |
| JP | 2011-6932 A | 1/2011 | ............. E21D 9/087 |
| JP | 4722220 | 7/2011 | ............. E21D 9/087 |
| JP | 2012-041781 | 3/2012 | ............. E21D 9/087 |

* cited by examiner

F I G. 11
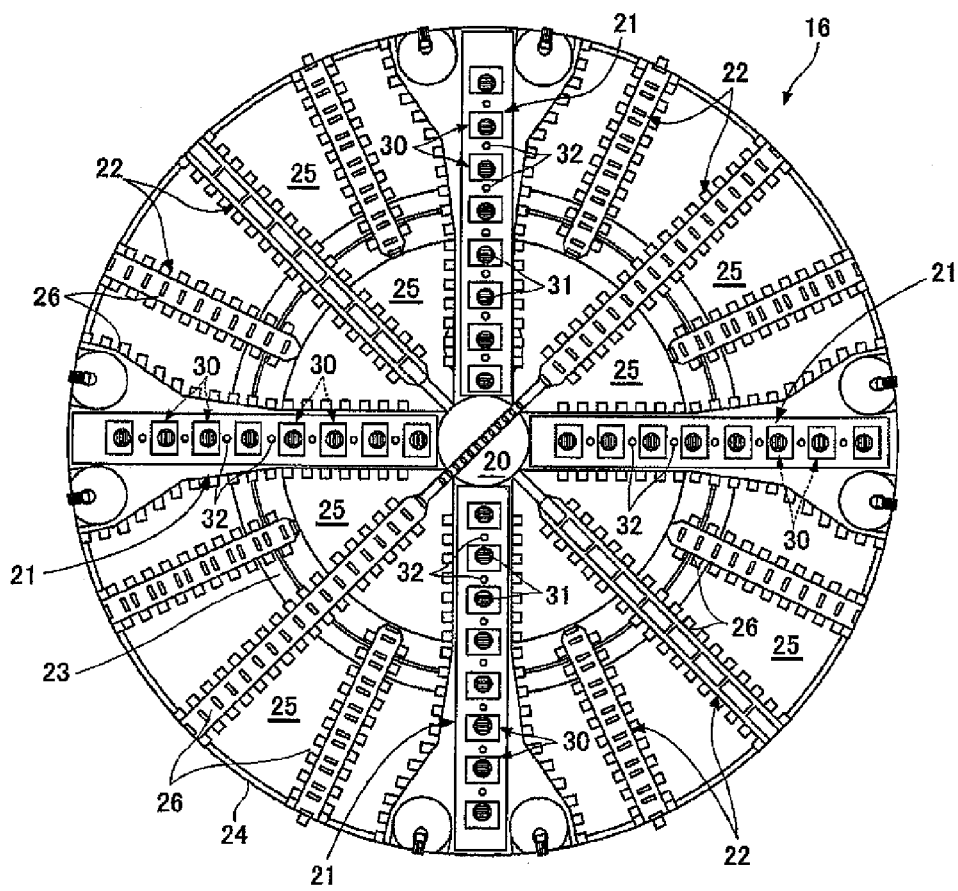

F I G. 1 2
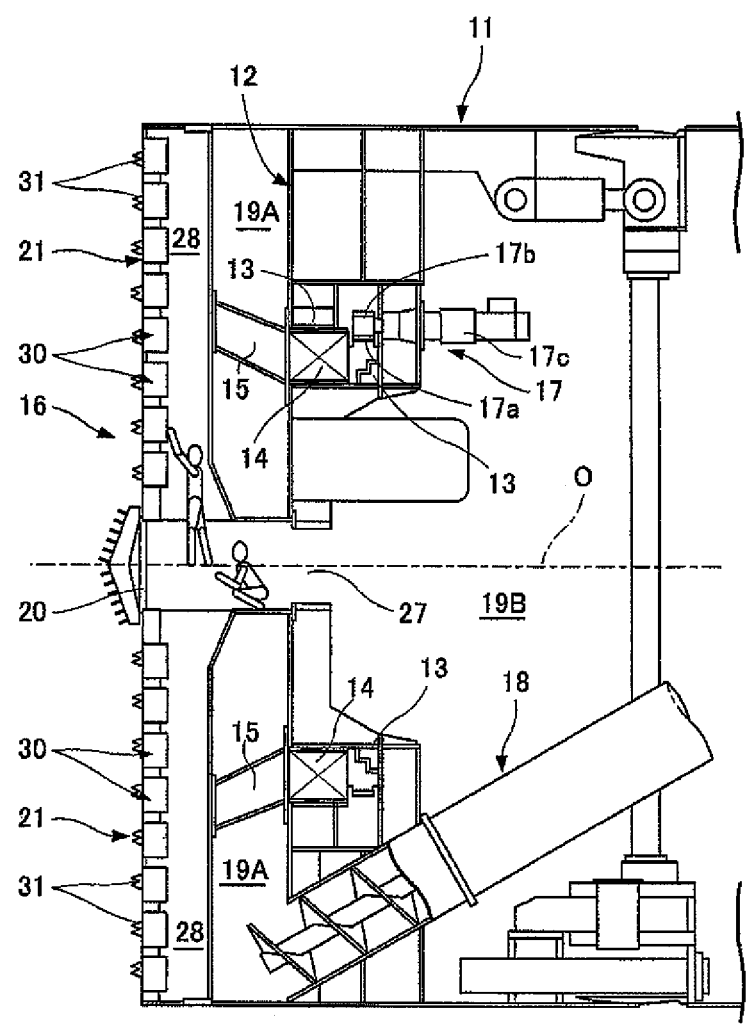

BIT EXCHANGE METHOD AND BIT EXCHANGE DEVICE FOR SHIELD TUNNELING MACHINE

FIELD OF THE INVENTION

The present invention relates to a bit exchange method and a bit exchange device which allow drill bits worn by drilling, e.g., a cutter bit and a roller bit to be exchanged during drilling from a working space kept at an atmospheric pressure in a cutter head in an earth-pressure shield tunneling machine that tunnels natural ground to form a tunnel while keeping a face collapse earth pressure.

BACKGROUND OF THE INVENTION

For example, a bit exchange device for exchanging a roller bit from a working space formed in a cutter head is disclosed in Japanese Patent No. 3139749 and Japanese Patent No. 4163965. The two bit exchange devices each have a rotating body with an opening at the front of cutter spokes. The roller bit is disposed in the opening of the rotating body. In replacement of cutters, the rotating body is rotated by 90° or 180° such that the opening of the rotating body faces an exchange opening near the side or back of the rotating body. The roller bit is then removed from the opening into the working space through the exchange opening, allowing replacement of the bit.

SUMMARY OF THE INVENTION

In the conventional literatures, however, the rotating body is disposed at the front of the cutter head (cutter spokes). Moreover, a sliding gap between the rotating body and a support member that supports the rotating body is exposed at the front of the cutter head. This may directly load a slop pressure to the sliding gap during drilling and cause fragments such as gravel to enter the sliding gap. Hence, a sealant provided in the sliding gap may be damaged or the rotations of the rotating body may be interrupted.

The present invention has been devised to solve the problem. An object of the present invention is to provide a bit exchange method and a bit exchange device for an excavator, which can improve sealing performance in a sliding gap so as to prevent the entry of muddy water.

An invention according to a first aspect is:

A bit exchange method for a shield tunneling machine in which a cutter head is supported at the front of a shield body so as to rotate around a shield axis, drilling bits are disposed on the front surface of the cutter head, and worn one of the drilling bits is exchanged from a working space provided in the cutter head, the method including:
retracting the drilling bit from a drilling position where the drilling bit is protruded forward from the front plate of the cutter head through an opening, to a protruding/retracting hole formed on a holding cylinder in a bit housing case on the back side of the front plate; meanwhile, injecting a filler from the drilling bit into a retraction space containing the retracted drilling bit, covering the opening surface of the holding cylinder by moving a gate plate so as to close an open/close space formed between the front plate and the opening surface of the holding cylinder in the bit housing case; and discharging the filler injected between the gate plate and the drilling bit in the protruding/retracting hole with a pressure reduced to an atmospheric pressure, allowing the gate plate to come into contact with the edge of the protruding/retracting hole at the front of the holding cylinder by a pressure difference between a face collapse earth pressure for pressing the gate plate from the front surface of the gate plate and an atmospheric pressure on the back side of the gate plate, and closing the protruding/retracting hole by pressing a sealant disposed between the edge of the protruding/retracting hole and the gate plate.

An invention according to a second aspect, in the method of the first aspect, the method further includes compressing the sealant by urging or retracting the gate plate backward with the pressure difference after closing the opening surface of the holding cylinder.

An invention according to a third aspect is:

a bit exchange device for a shield tunneling machine in which a cutter head is supported at the front of a shield body so as to rotate around a shield axis, drilling bits are disposed on the front surface of the cutter head, and worn one of the drilling bits is exchanged from a working space provided in the cutter head, the bit exchange device including a bit housing case in the working space behind the back side of an opening formed on the front plate of the cutter head, the bit housing case covering the opening and including an insertion/removal opening where the drilling bit is insertable and removable on the back side of the bit housing case, the bit housing case including:
a holding cylinder disposed with an open/close space between the opening of the front plate and the holding cylinder, the holding cylinder having a protruding/retracting hole for holding the drilling bit in a protruding or retracting manner along a protruding/retracting axis;

a bit fixture capable of fixing the drilling bit in the protruding/retracting hole, at a drilling position where the drilling bit protrudes forward from the opening of the front plate;

a gate plate movable in the open/close space so as to open and close the protruding/retracting hole;

a water sealant disposed between the gate plate and the edge of the protruding/retracting hole, on the front surface of the holding cylinder; and a communicating hole formed on the drilling bit so as to supply a filler to the front of the drilling bit, wherein the filler is injected into a retraction space at the front of the drilling bit from the communicating hole [a (filler) supply/discharge pipe is omitted] of the drilling bit while the drilling bit is retracted into the holding cylinder from the drilling position; the filler between the gate plate and the drilling bit is discharged from the communicating hole in the protruding/retracting hole after the protruding/retracting hole is closed by the gate plate; a space between the gate plate and the drilling bit communicates with the working space with a pressure reduced to an atmospheric pressure; and the gate plate is pressed to the front surface of the holding cylinder by a pressure difference between a face collapse earth pressure of the front side of the gate plate and an atmospheric pressure on the back side of the gate plate, pressing the water sealant so as to close the protruding/retracting hole.

An invention according to a fourth aspect, in the configuration of the third aspect, the front surface of the holding cylinder and the gate plate are formed on a circular surface around an open/close axis perpendicular to the protruding/retracting axis behind the open/close space, and the bit exchange device further including a bearing body provided on at least one of two ends disposed along an open/ close shaft direction, the bearing body rotationally supporting the gate plate via the open/close shaft, and a movable support mechanism provided to movably guide the bearing body along the protruding/retracting axis direction.

An invention according to a fifth aspect, in the configuration of the fourth aspect, the bit exchange device further includes one of an urging support mechanism and a driving support mechanism, the urging support mechanism urging the bearing body backward along the protruding/retracting axis, the driving support mechanism driving the bearing body along the protruding/retracting axis direction.

An invention according to a sixth aspect, in the configuration of any one of the third to fifth aspects, the drilling bit is a roller bit including a disc cutter rotationally supported by a bit holder, and the communicating hole formed on the bit holder is selectively connected to a mud discharge pipe for discharging mud drilled by the roller bit and a filler supply/discharge pipe capable of supplying and discharging the filler.

According to the invention of the first aspect, the filler is injected into the retraction space of the drilling bit, thereby preventing soil or mud from entering the bit housing case from the opening. The opening surface of the protruding/retracting hole is closed with the gate plate at the front of the holding cylinder, and then the filler injected between the gate plate and the drilling bit is discharged in the protruding/retracting hole with a pressure reduced to an atmospheric pressure. The gate plate is pressed to the edge at the front of the holding cylinder by a pressure difference between a face collapse earth pressure on the front surface of the gate plate and an atmospheric pressure at the back side of the gate plate, compressing the water sealant. This can effectively seal the opening surface of the holding cylinder. When the gate plate is opened or closed, the gate plate and the water sealant can be opened or closed in a noncontact manner or slightly in contact with each other. This can prevent damage on the water sealant, allowing the gate plate to be opened or closed with only a small amount of power.

According to the invention of the second aspect, the gate plate is pressed to the opening surface of the holding cylinder. Thus, even in the case of a small pressure difference between a face collapse earth pressure and an atmospheric pressure, the sealing performance can be maintained with reliability.

According to the invention of the third aspect, the filler is injected into the retraction space where the drilling bit is retracted. This can prevent soil and mud from entering the bit housing case from the opening. Moreover, the opening surface of the protruding/retracting hole is closed at the front of the holding cylinder by the gate plate, and then the filler injected between the gate plate and the drilling bit in the protruding/retracting hole is discharged from the communicating hole with a pressure reduced to an atmospheric pressure. Thus, the gate plate is pressed to the front of the holding cylinder by a pressure difference between a face collapse earth pressure loaded to the front surface of the gate plate and an atmospheric pressure loaded to the back side of the gate plate. This can compress the water sealant so as to effectively seal the opening surface of the holding cylinder. When the gate plate is opened or closed, the gate plate and the water sealant can be opened or closed in a noncontact manner or slightly in contact with each other. This can prevent damage on the water sealant, allowing the gate plate to be opened or closed with only a small amount of power.

According to the invention of the fourth aspect, the opening surface of the holding cylinder and the gate plate are formed on the circular surface, thereby pivotally opening and closing the gate plate about the open/close shaft with a small configuration. Moreover, the bearing body supporting the open/close shaft is movably supported by the movable support mechanism in the longitudinal direction along the protruding/retracting axis. This can effectively use a pressure difference so as to close the opening surface of the holding cylinder with the gate plate.

According to the invention of the fifth aspect, the gate plate can be pressed to the front of the holding cylinder by a pressure applied by the urging support mechanism or the driving support mechanism and a pressure difference between a face collapse earth pressure and an atmospheric pressure. This can more effectively compress the sealant to seal the opening of the holding cylinder. Even in the case of a small pressure difference between a face collapse earth pressure and an atmospheric pressure, the water sealant can be compressed by a pressure applied by the urging support mechanism or the driving support mechanism, thereby effectively sealing the front surface of the holding cylinder.

According to the invention of the sixth aspect, even if hard ground is drilled by the roller bit, the worn disc cutter can be easily exchanged from the working space. The mud discharge pipe is connected to the communicating hole formed in the bit holder of the roller bit, smoothly discharging drilled soil. The connection of the filler supply/discharge pipe can effectively supply the filler into the retraction space.

BRIEF DESCRIPTION OF DRAWINGS

FIG. 11 is an overall front view of a shield tunneling machine.

FIG. 12 shows an overall longitudinal section of the shield tunneling machine.

DETAILED DESCRIPTION OF THE PREFERRED EMBODIMENT

Figure 1:
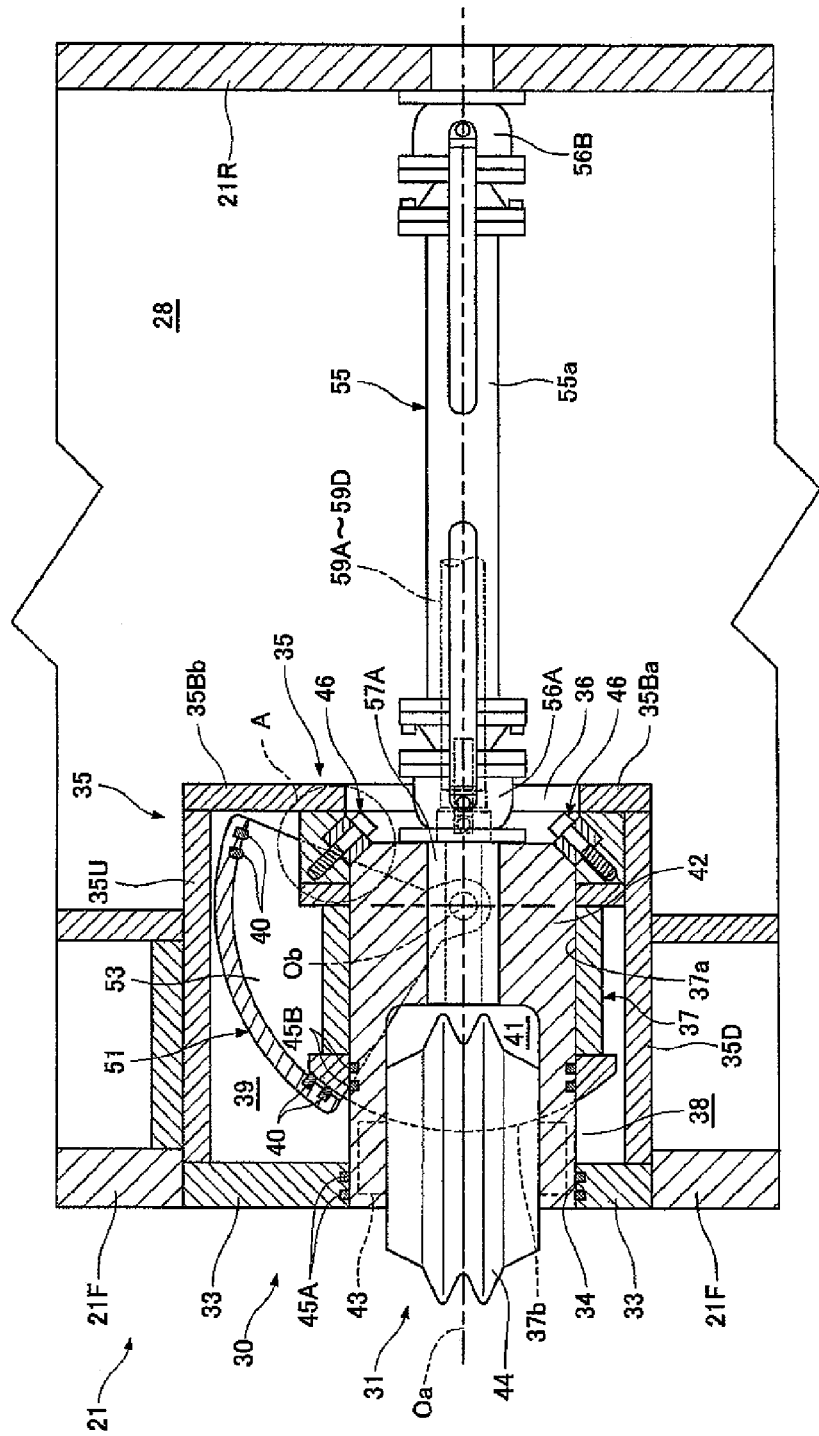
FIG. 1 illustrates a longitudinal section showing a main spoke as an embodiment of a bit exchange unit of a shield tunneling machine according to the present invention.
Figure 2:
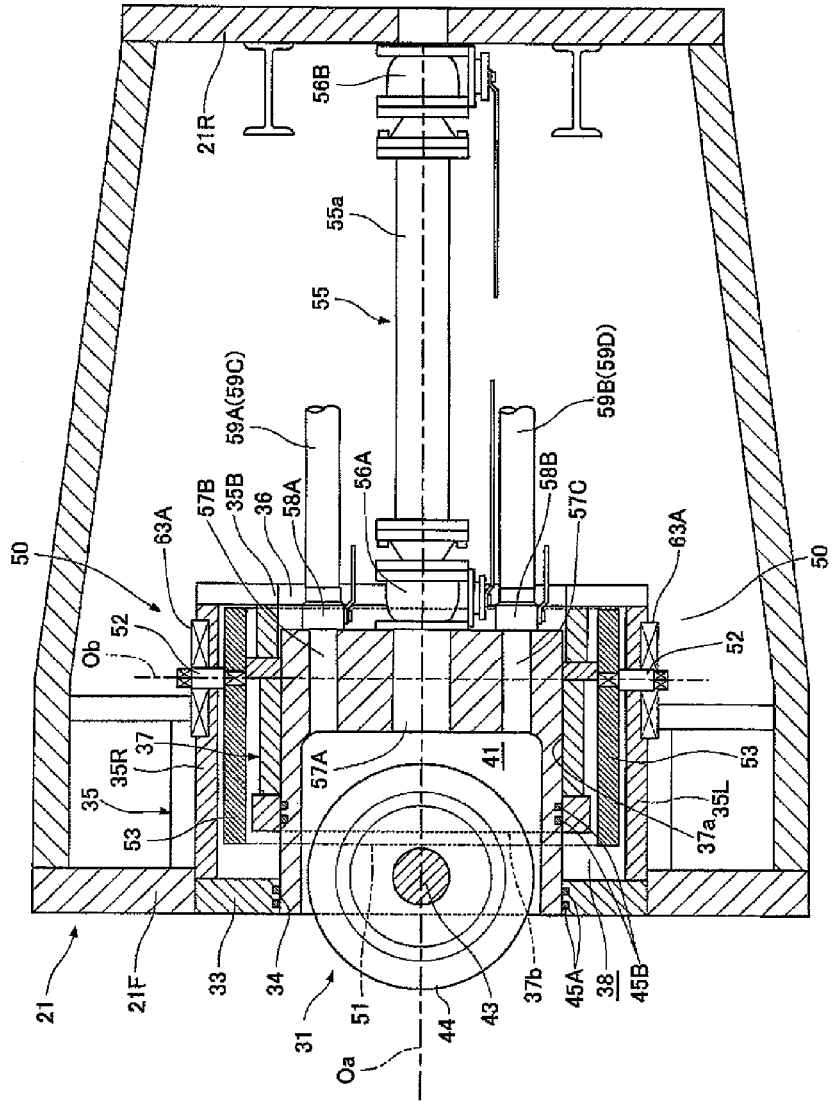
FIG. 2 is a cross-sectional view showing the main spoke as the bit exchange unit.
Figure 3A:
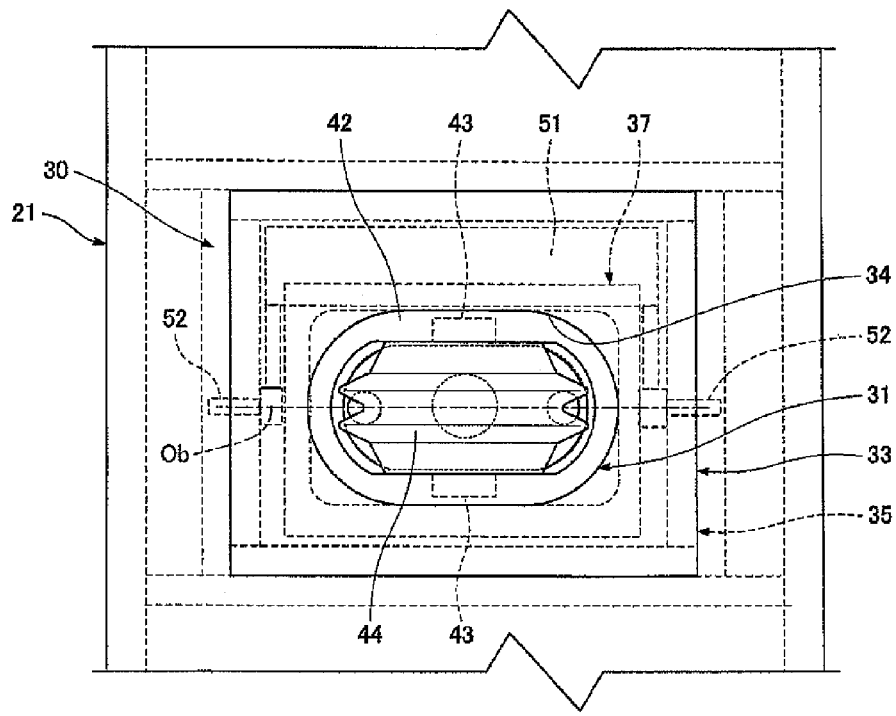
FIG. 3A is a front view of the bit exchange unit.
Figure 3B:
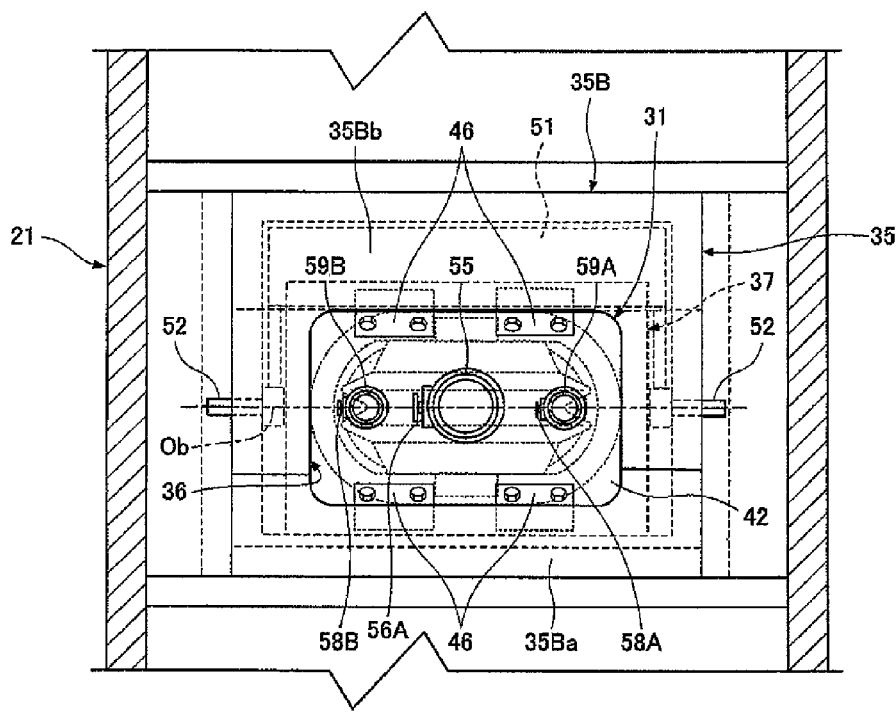
FIG. 3B is a rear view of the bit exchange unit.

An embodiment of a bit exchange device for a shield tunneling machine according to the present invention will be described below with reference to the accompanying drawings.

(Shield tunneling machine) As shown in FIG. 12, a shield tunneling machine includes a pressure bulkhead 12 provided at the front of a cylindrical shield body 11, and a pressure chamber 19A provided at the front of the pressure bulkhead 12 so as to keep a face collapse earth pressure. The pressure bulkhead 12 has a slewing ring body 14 supported via a slewing bearing 13 so as to rotate about a shield axis O. A circular cutter head 16 covering the front surface of the pressure chamber 19A is supported by a plurality of support legs 15 protruding to the front from the slewing ring body 14. An atmospheric space 19B behind the pressure bulkhead 12 contains a cutter drive unit 17 that rotates the cutter head 16. The cutter drive unit 17 includes a ring gear 17a provided on the back of the slewing ring body 14, a plurality of drive pinions 17b engaged with the ring gear 17a, and a rotating unit (hydraulic or electric motor) 17c which rotates each of the drive pinions 17b. Furthermore, a soil-removing screw conveyor 18 penetrates the pressure bulkhead 12. The soil-removing screw conveyor 18 discharges soil drilled by the cutter head 16, from the pressure chamber 19A to the atmospheric space 19B with a kept face collapse earth pressure.

(Cutter head) As shown in FIG. 11, the cutter head 16 includes a plurality of main spokes 21 radially extending from a center member 20 disposed on the shield axis O, a plurality of sub spokes 22 radially extending between the main spokes 21, and an intermediate ring 23 and an outer ring 24 that are circularly disposed around the shield axis O so as to connect the main spokes 21 and the sub spokes 22. Soil inlet openings 25 are formed between the members 21 to 24.

Furthermore, a plurality of bit exchange units (bit exchange device) 30 and fixed cutter bits 32 according to the present invention are alternately disposed at the front of the main spoke 21. The bit exchange units 30 each have a roller bit (drilling bit) 31. Moreover, a plurality of fixed bits 26 are provided on the center member 20, at the front and sides of the sub spokes 22, and at the front of the main spoke 21.

As shown in FIG. 11, a manhole 27 allowing the passage of workers is provided at the rear of the center member 20. The manhole 27 penetrates the pressure bulkhead 12 so as to allow the passage of workers from the atmospheric space 19B. Furthermore, a working space 28 at atmospheric pressure is formed behind the main spokes 21 so as to allow a worker to exchange the bits. The manhole 27 communicates with the working space 28 such that a worker can enter and return from the working space 28 from the manhole 27. During drilling, the worn roller bits 31 can be exchanged from the working space 28.

(Bit exchange unit) As shown in FIGS. 1 to 3A and 3B, the bit exchange unit 30 has an opening 34 formed on a unit front plate (front plate) 33 disposed in the notch of a front plate 21F of the main spoke 21. The roller bit 31 at a drilling position is protruded from the opening 34. On the back side of the unit front plate 33, a bit housing case 35 is attached from the periphery of the opening 34 near the working space 28. The bit housing case 35 is shaped like a box having a left side plate 35L, a right side plate 35R, a top plate 35U, a bottom plate 35D, and a back side plate 35B that are fixed on the unit front plate 33. The plates are closed except for the front-side opening 34 and a rear-side insertion/removal opening 36, which will be described later. The back side plate 35B is divided near the bottom of the main spoke 21 into a lower half serving as a fixed portion 35Ba on the unit front plate 33 and an upper half serving as a separated portion 35Bb removable from the fixed portion 35Ba. The insertion/removal opening 36 is formed between the fixed portion 35Ba and the separated portion 35Bb such that the roller bit 31 can be inserted and removed from the insertion/removal opening 36.

In the bit housing case 35, a holding cylinder 37 is installed behind the opening 34 of the unit front plate 33. The holding cylinder 37 has a protruding/retracting hole 37a formed along, for example, a protruding/retracting axis Oa parallel to the shield axis O. The roller bit 31 is supported in the protruding/retracting hole 37a so as to protrude and retract in the longitudinal direction. The bit housing case 35 has an open/close space 38, in which a gate plate 51 is movable, between the holding cylinder 37 and the unit front plate 33. Furthermore, a gate housing space 39 capable of housing the gate plate 51 is formed on the holding cylinder 37. The holding cylinder 37 further includes an opening surface 37b where the protruding/retracting hole 37a is opened and closed by the gate plate 51, the opening surface 37b facing the open/close space 38 at the front of the holding cylinder 37. The opening surface 37b and the gate plate 51 are formed on a circular surface about an open/close axis Ob of the tangential direction of the cutter head 16 that is perpendicular to the protruding/retracting axis Oa behind the holding cylinder 37. The roller bit 31 is formed in a bit holder 42 that is shaped like a tube substantially oval and rectangular in cross section. A mud discharge space 41 is formed in the longitudinal direction at the front of the bit holder 42. Two disc cutters 44 are rotationally supported at the front of the mud discharge space 41 via a spindle 43 provided along the breadth of the disc cutter 44.

Furthermore, bit sealants 45A are attached to the inner surface of the opening 34 on the unit front plate 33 with attachment grooves. Additionally, bit sealants 45B are attached to the outer surface of the intermediate part of the bit holder 42 with attachment grooves.

Figure 4:
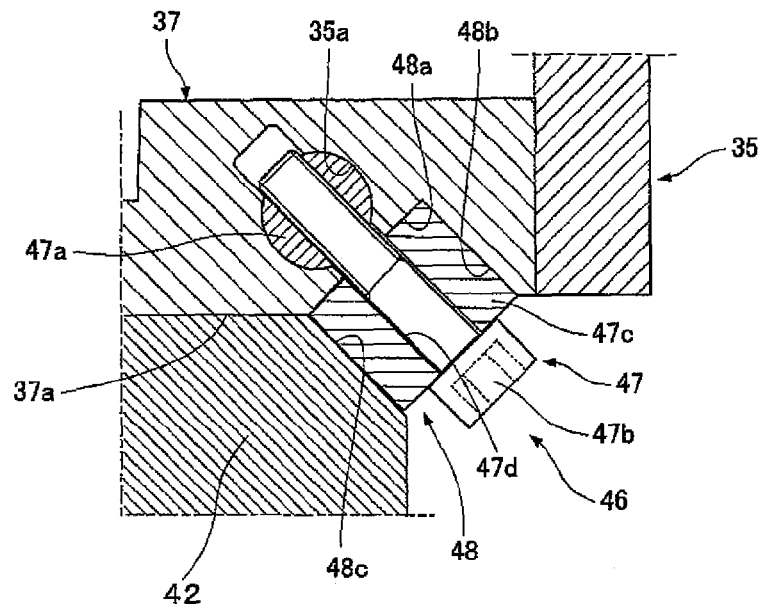
FIG. 4 is an enlarged view of an A part of FIG. 1.

(Bit fixtures) As shown in FIGS. 1 and 4, a plurality of bit fixtures 46 are provided in the rear of the bit housing case 35. The bit fixtures 46 can fix the bit holder 42 at a drilling position and can release the bit holder 42 at the time of replacement. On the bit housing case 35 and the bit holder 42, the bit fixture 46 has a block fitting portion 48 and a fixed member 47 that is fit into the block fitting portion 48. The block fitting portion 48 has a square groove formed that is longitudinally extended with an inclined end face 48a and an inclined support face 48b at an angle of substantially 90°, behind and in the upper and lower portion of the long side of the bit housing case 35. Moreover, an inclined receiving surface 48c is formed on the back side of the holding cylinder 37 so as to form an angle of substantially 90° with respect to the inclined end face 48a. The fixed member 47 includes a shaft-shaped nut (barrel nut) 47a that is attached into a support hole 35a formed on the holding cylinder 37 in the long side direction of the bit housing case 35, a fixed bolt 47b that can be attached, removed, and fastened in the female threaded hole of the shaft-shaped nut 47a, and an edge block 47c shaped like a rectangular solid fit into the block fitting portion 48. The edge block 47c has a through hole 47d where the fixed bolt 47b is fit. This fits the edge block 47c into the block fitting portion 48. The fixed bolt 47b is attached and fastened into the female threaded hole of the shaft-shaped nut 47a from the through hole 47d so as to press the inclined end face 48a and the inclined receiving surface 48c with the edge block 47c. This can firmly fix the disc cutters 44 to the main spoke 21 via the bit holder 42 by means of the fixed member 47. At this point, the drilling reaction force of the roller bit 31 is transmitted from the inclined receiving surface 48c to the inclined support face 48b and is supported by the bit housing case 35.

(Gate open/close device) The bit housing case 35 contains a gate open/close device 50 including the gate plate 51 that can open and close the opening surface 37b of the holding cylinder 37. The gate open/close device 50 includes the gate plate 51, open/close shafts 52 that can open and close the gate plate 51 by means of an electric, hydraulic, or manual rotating tool, and a gate sealing member that can close the protruding/retracting hole 37a of the holding cylinder 37 with the gate plate 51.

A fan-shaped connecting plate 53 that extends to the open/close axis Ob from left and right circular sector sides is attached to the gate plate 51. The fixed end of the connecting plate 53 is fixed to the open/close shafts 52 that are rotationally supported to penetrate the left and right side plates 35R and 35L. Thus, the open/close shafts 52 are rotated by the rotating tool so as to pivot the gate plate 51 between an opening position in the gate housing space 39 and a closing position in the open/close space 38, thereby opening and closing the protruding/retracting hole 37a of the opening surface 37b.

Figure 5:
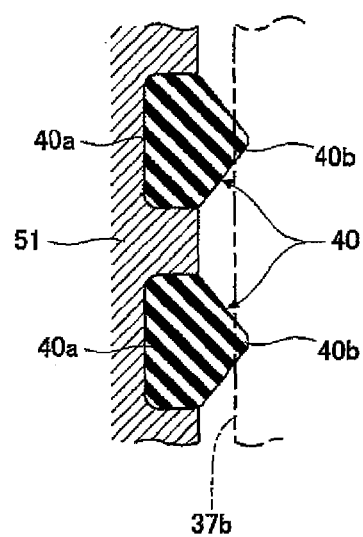
FIG. 5 is an enlarged cross-sectional view showing a water sealant.

A water sealant 40 for sealing a gap between the opening surface 37b and the gate plate 51 at the closing position is provided so as to extend over the inner surface of the gate plate 51. As shown in FIG. 5, the water sealant 40 is, for example, a special O ring substantially pentagonal in cross section. The O ring has attachment portions 40a that are rectangular in cross section and are fit into housing grooves and sliding contact portions 40b that are angular in cross section and protrude from the attachment portions 40a. As a matter course, the water sealant 40 may be provided along the edge of the protruding/retracting hole 37a of the opening surface 37b.

Regarding the water sealant 40 and the bit sealants 45A and 45B, the water sealant 40 and the bit sealant 45B can be exchanged from the working space 28 under atmospheric pressures. Specifically, if the water sealant 40 is replaced with another, the separated portion 35Bb of the back side plate 35B is removed, and then the open/close shafts 52 are separated so as to remove the gate plate 51 into the working space 28. This allows the replacement of the broken water sealant 40. If the bit sealant 45B is replaced with another, the broken bit sealant 45B can be replaced when the bit holder 42 is drawn to replace the roller bit 31. Hence, even if the water sealant 40 or the bit sealant 45B is broken during drilling, the sealant can be replaced from the working space 28 while cutting off water. This improves the reliability of the bit exchange unit 30.

A mud discharge pipe 55 for discharging soil drilled by the disc cutters 44 is connected to the bit holder 42 of the roller bit 31. The bit holder 42 has a communicating hole 57A that communicates with the mud discharge space 41. The mud discharge pipe 55 is connected to the back side of the communicating hole 57A. The mud discharge pipe 55 extends along the protruding/retracting axis Oa in the working space 28, penetrates a back side plate 21R of the main spoke 21, and is opened on the pressure chamber 19A. The mud discharge pipe 55 includes a first mud discharge valve 56A connected to the communicating hole 57A, a separating flange for the valve 56A, a second mud discharge valve 56B connected to a penetrating portion in the back side plate 21R, a separating flange for the valve 56B, and a mud discharge pipe body 55a separably connected between the two separating flanges. Thus, the two separating flanges can be separated from each other to remove the mud discharge pipe body 55a during the replacement of the bit.

Moreover, two communicating holes 57B and 57C communicating with the mud discharge space 41 are opened on the back side of the bit holder 42. Open/close valves 58A and 58B are attached to the communicating holes 57B and 57C, respectively. Furthermore, a filler supply pipe (filler supply/discharge pipe) 59A, a filler discharge pipe (filler supply/discharge pipe) 59B, a wash water supply pipe 59C, and a wash water discharge pipe 59D (may be shared with the filler discharge pipe 59B) are selectively connected to the open/close valves 58A and 58B so as to supply and discharge a filler and wash water.

(Gate sealing member) The gate sealing member applies a pressure to seal the gate plate 51 by using a pressure difference between a face collapse earth pressure (drilling ground pressure) that presses the gate plate 51 from the front and an atmospheric pressure (a barometric pressure in the working space 28). Basically, as will be described later in A), only a movable support mechanism 61 is necessary that uses only a pressure difference between a face collapse earth pressure and an atmospheric pressure. In preparation for a reduction in sealing performance because of a small pressure difference between a face collapse earth pressure and an atmospheric pressure, a gate seal reinforcing member is provided to compress the water sealant 40 by retracting the gate plate 51 via the open/close shafts 52 along the protruding/retracting axis Oa direction. The gate seal reinforcing member is, for example, an urging support mechanism 62 that urges the open/close shafts 52 backward as will be described later in B), and first to third driving support mechanisms 63A to 63C that drive the open/close shafts 52 backward with a mechanical driving force as will be described later in C) to E). The gate seal reinforcing member is selected from B) to E), which will be described later.

Referring to FIGS. 6 to 8C, the movable support mechanism 61, the urging support mechanism 62, and the first to third driving support mechanisms 63A to 63C will be described below. The same members are indicated by the same reference numerals and the explanation thereof is omitted.

Figure 6:
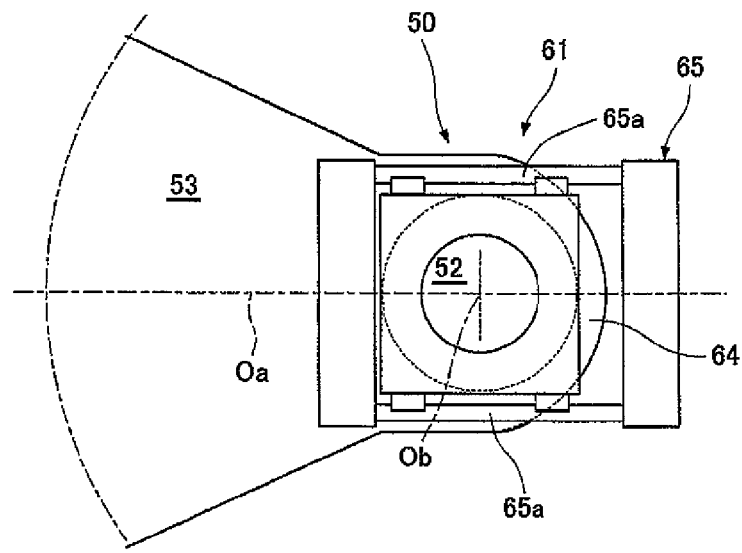
FIG. 6 is an explanatory drawing showing a movable support mechanism constituting a gate moving device.

A) As shown in FIG. 6, the movable support mechanism 61 includes a bearing body 64 that rotationally supports a pair of the left and right open/close shafts 52, and a bearing guide frame 65 that movably supports the bearing body 64 in a predetermined range along the protruding/retracting axis Oa direction. Guide rails 65a are provided along the upper and lower sides of the guide space of the guide frame 65. The bearing body 64 is guided so as to longitudinally move along the upper and lower guide rails 65a.

Thus, during replacement, the roller bit 31 is retracted to the protruding/retracting hole 37a; meanwhile, a filler is injected into the retraction space (including the open/close space 38 and the gate housing space 39) of the roller bit 31 from the filler supply pipe 59A through the communicating hole 57B. The open/close shafts 52 are then rotated using a manual or rotating tool so as to move the gate plate 51 from the opening position to the closing position, thereby closing the protruding/retracting hole 37a of the holding cylinder 37. After that, the filler injected between the gate plate 51 and the roller bit 31 is discharged into the filler discharge pipe 59B through the communicating hole 57C and then is fed into the atmospheric pressure side of the working space 28. Hence, the front side of the gate plate 51 having a filler residue receives a high pressure because of a face collapse earth pressure, whereas the communicating hole 57B behind the gate plate 51 after the discharge of the filler communicates with the working space 28 under an atmospheric pressure. Thus, the gate plate 51 is pressed by a pressure difference between a face collapse earth pressure and an atmospheric pressure, the open/close shafts 52 are displaced backward via the bearing body 64 and the bearing guide frame 65 along the protruding/retracting axis Oa direction, and the gate plate 51 is pressed to the opening surface 37b. This compresses the water sealant 40 so as to seal the protruding/retracting hole 37a of the holding cylinder 37.

Figure 7:
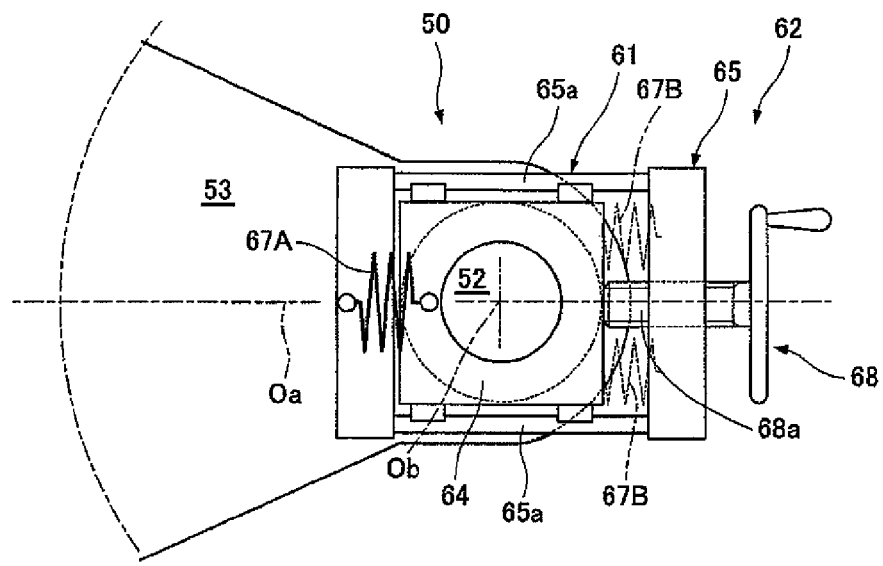
FIG. 7 is an explanatory drawing showing an urging support mechanism constituting the gate moving device.

B) As shown in FIG. 7, the urging support mechanism 62 includes a compression coil spring 67A or extension coil springs 67B which urge the bearing body 64 of the movable support mechanism 61 backward along the protruding/retracting axis Oa. Moreover, in order to prevent the application of a biasing force of the coil springs 67A and 67B to the bearing body 64 when the gate plate 51 is opened or closed, the bearing guide frame 65 includes a screw-type open/close shaft fixture 68 with a threaded shaft 68a that regulates retraction of the bearing body 64.

Thus, the open/close shaft fixture 68 holds the bearing body 64 at a position where the water sealant 40 of the gate plate 51 does not come into contact with the opening surface 37b of the holding cylinder 37. The gate plate 51 is then moved to the closing position by the rotating tool so as to close the protruding/retracting hole 37a of the holding cylinder 37. After that, the filler injected between the gate plate 51 and the roller bit 31 is discharged through the filler discharge pipe 59B, the inside of the protruding/retracting hole 37a behind the gate plate 51 communicates with the working space 28 so as to be decompressed to an atmospheric pressure after the discharge of the filler. At that time or thereafter, the open/close shaft fixture 68 is retracted and released. Thus, the gate plate 51 is pressed to the opening surface 37b by a pressure difference between a face collapse earth pressure and an atmospheric pressure and the biasing force of the compression coil spring 67A (or the extension coil spring 67B). The water sealant 40 is then compressed to effectively seal the protruding/retracting hole 37a of the holding cylinder 37.

Figure 8A:
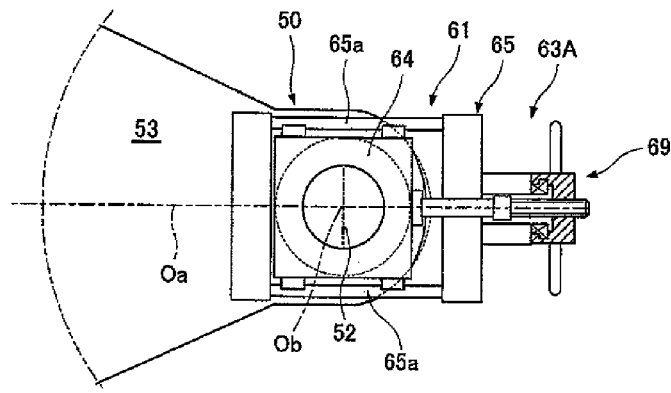
FIG. 8A is a side cross-sectional view showing a screw jack structure as an example of a driving support mechanism constituting the gate moving device.

C) As shown in FIG. 8A, the first driving support mechanism 63A includes a manual (may be electric or hydraulic) jack device 69 that drives the gate plate 51 to the bearing body 64 of the movable support mechanism 61 in a predetermined range along the protruding/retracting axis Oa direction. Thus, the gate plate 51 is moved to the closing position and then the bearing body 64 is moved backward by the jack device 69 so as to press the gate plate 51 to the opening surface 37b. At the same time, the filler injected between the gate plate 51 and the roller bit 31 is discharged through the filler discharge pipe 59B, reducing a pressure in the protruding/retracting hole 37a behind the gate plate 51 to an atmospheric pressure. Hence, the gate plate 51 at the closing position is pressed to the opening surface 37b by a pressure applied from the gate plate 51 by the jack device 69 and a pressure difference between a face collapse earth pressure and an atmospheric pressure, allowing the water sealant 40 to effectively seal the protruding/retracting hole 37a of the holding cylinder 37.

Figure 8B:
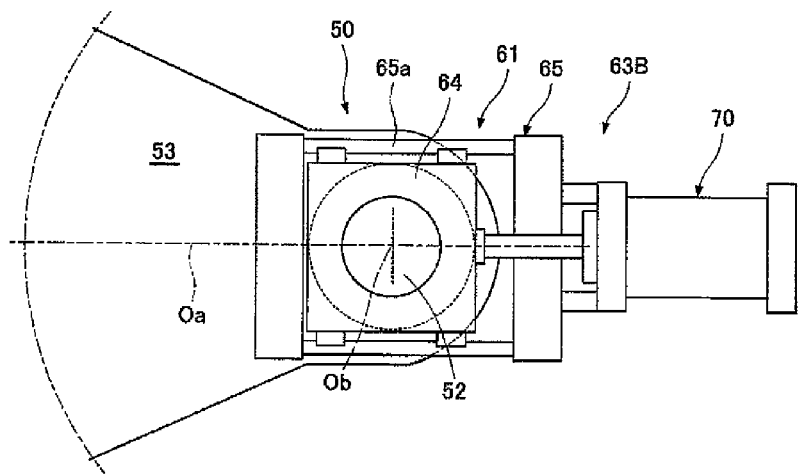
FIG. 8B is a side view showing a cylinder structure as an example of the driving support mechanism constituting the gate moving device.

D) As shown in FIG. 8B, the second driving support mechanism 63B includes a hydraulic enclosing cylinder 70 connected to the bearing body 64 of the movable support mechanism 61. The enclosing cylinder 70 drives the gate plate 51 in a predetermined range along the protruding/retracting axis Oa direction. This presses the gate plate 51 at the closing position to the opening surface 37b by using a pressure difference between a face collapse earth pressure applied by the movable support mechanism 61 and an atmospheric pressure and a pressure applied by the enclosing cylinder 70, compressing the water sealant 40 so as to effectively seal the protruding/retracting hole 37a of the holding cylinder 37.

Figure 8C:
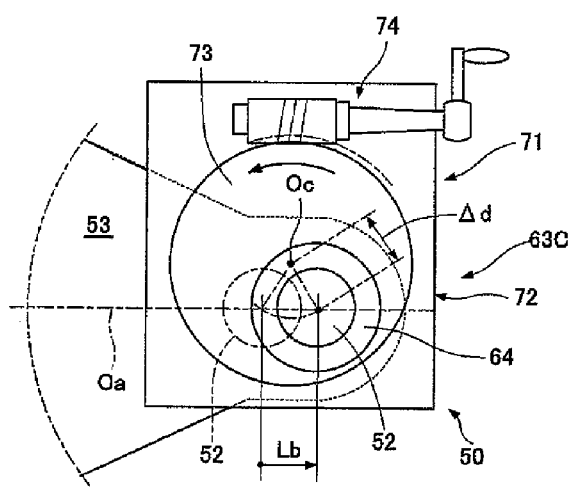
FIG. 8C is a side view showing an eccentric axis structure as an example of the driving support mechanism constituting the gate moving device.

E) As shown in FIG. 8C, the third driving support mechanism 63C includes an eccentric displacing device 71 that can move the gate plate 51 in a predetermined range along the protruding/retracting axis Oa direction.

The eccentric displacing device 71 causes an external bearing body 72 attached to the bit housing case 35 to rotationally support an external rotating body 73. The bearing body 64 for rotationally supporting the open/close shafts 52 is provided at a position decentered from a rotation axis Oc of the external rotating body 73 by an eccentricity Δd. For a rotation of the external rotating body 73 in a predetermined range, for example, a manual bevel gear device 74 is provided. Thus, the gate plate 51 is moved from the opening position via the open/close shafts 52 to the closing position for covering the opening surface 37b, and then the bevel gear device 74 is driven to rotate the external rotating body 73 in an arrow direction, moving the bearing body 64 backward by a predetermined distance Lb. This can press the gate plate 51 to the opening surface 37b. Moreover, the filler injected between the gate plate 51 and the roller bit 31 is discharged from the filler discharge pipe 59B to communicate with the working space 28, reducing a pressure in the communicating hole 57B to an atmospheric pressure after the discharge of the filler. Hence, the gate plate 51 at the closing position is pressed to the opening surface 37b by a pressure applied from the gate plate 51 by the eccentric displacing device 71 and a pressure difference between a face collapse earth pressure and an atmospheric pressure, allowing the water sealant 40 to effectively seal the protruding/retracting hole 37a of the holding cylinder 37.

(Exchanging operation) An exchanging operation of the bit exchange unit 30 including the manual jack device 69 in the urging support mechanism 62 will be described below.

1) The rotation of the cutter head 16 is stopped, and then a worker enters the working space 28 and moves to the back side of the worn roller bit 31. The filler supply pipe 59A and the filler discharge pipe 59B are connected to the open/close valves 58A and 58B, respectively. Subsequently, the first and second mud discharge valves 56A and 56B of the mud discharge pipe 55 are closed, and then the mud discharge pipe body 55a is removed. After that, the bit fixtures 46 are removed to release the roller bit 31, and then a push/pull tool (not shown) such as a jack is attached between the bit holder 42 and the back side plate 21R of the main spoke 21 so as to draw the roller bit 31.

Figure 9:
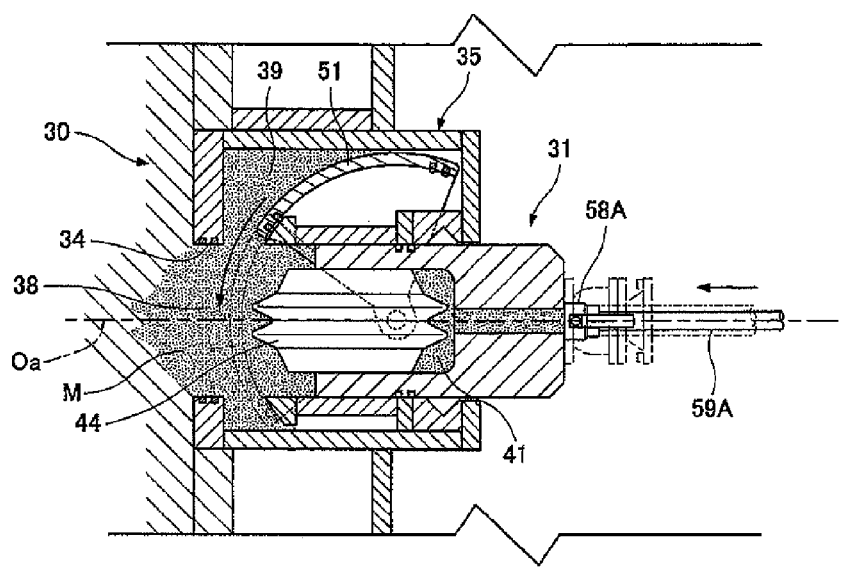
FIG. 9 is a side cross-sectional view for explaining a state of a retracted bit in the step of exchanging the bit.

2) As shown in FIG. 9, the open/close valve 58A is opened to inject a filler M from the filler supply pipe 59A; meanwhile, the push/pull tool draws the roller bit 31 to the protruding/retracting hole 37a along the protruding/retracting axis Oa. This supplies the filler into a space where the roller bit 31 at the front has retracted from the mud discharge space 41. This prevents a flow of soil entering from the opening 34. When the bit holder 42 is drawn into the protruding/retracting hole 37a, the filler M is injected into the open/close space 38 and the gate housing space 39 from the protruding/retracting hole 37a.

Figure 10:
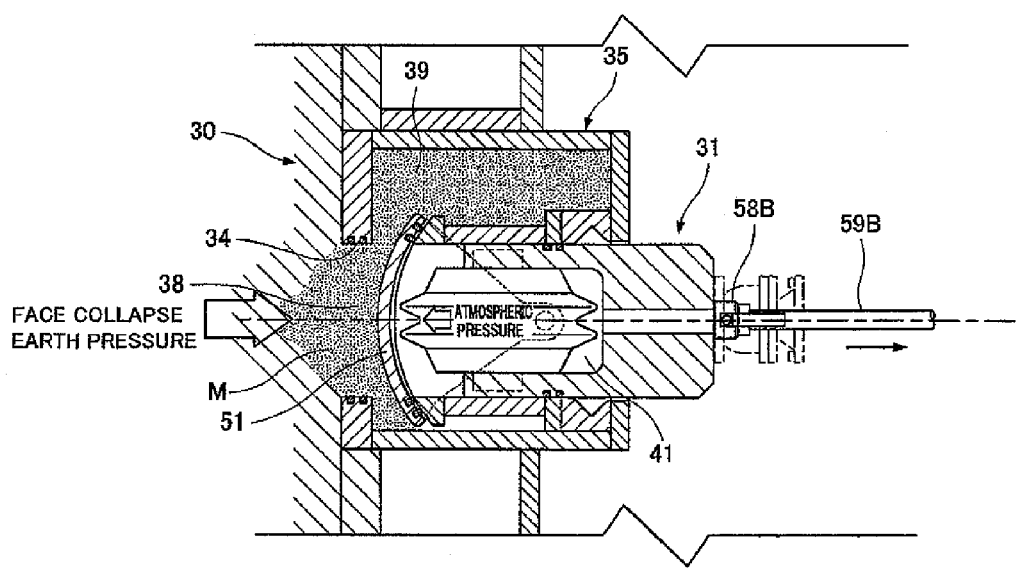
FIG. 10 is a side cross-sectional view for explaining a closed state of a holding cylinder in the step of exchanging the bit.

3) When the disc cutters 44 are completely drawn into the gate housing space 39, the open/close valve 58A is closed to stop the supply of the filler M. The gate open/close device 50 is then started to move the gate plate 51 from the opening position to the closing position of the open/close space 38, thereby closing the protruding/retracting hole 37a of the holding cylinder 37. After that, the jack device 69 is operated to press the gate plate 51 to the opening surface 37b; meanwhile, as shown in FIG. 10, the open/close valve 58B is opened to discharge the filler, which has been injected between the gate plate 51 and the roller bit 31, into the working space 28 from the filler discharge pipe 59B, causing the protruding/retracting hole 37a to communicate with the working space 28 under an atmospheric pressure. Thus, the gate plate 51 at the closing position is pressed to the opening surface 37b by a pressure applied from the gate plate 51 by the jack device 69 and a pressure difference between a face collapse earth pressure and an atmospheric pressure. This compresses the water sealant 40 so as to effectively seal the protruding/retracting hole 37a of the holding cylinder 37.

4) The filler supply pipe 59A and the filler discharge pipe 59B are removed from the bit holder 42. The absence of a water leak from the opening surface 37b to the protruding/retracting hole 37a is confirmed, and then the bit holder 42 is drawn by the push/pull tool into the working space 28 from the protruding/retracting hole 37a through the insertion/removal opening 36.

5) The bit holder 42 provided with a new roller bit 31 is inserted into the protruding/retracting hole 37a of the holding cylinder 37 and is pressed by the push/pull tool, and then the wash water supply pipe 59C and the wash water discharge pipe 59D are connected to the open/close valves 58A and 58B of the bit holder 42. The gate open/close device 50 is then started to move the gate plate 51 from the closing position to the opening position, thereby opening the protruding/retracting hole 37a of the holding cylinder 37. After that, the bit holder 42 is pressed to the front in the protruding/retracting hole 37a by the push/pull tool; meanwhile, the open/close valves 58A and 58B are opened to supply wash water to the front of the bit holder 42 from the wash water supply pipe 59C and discharge wash water containing the filler from the wash water discharge pipe 59D. Furthermore, the roller bit 31 is protruded to a use position from the opening 34 of the unit front plate 33 and then is locked by the bit fixtures 46.

(Effect of the embodiment) According to the embodiment, the roller bit 31 is retracted from a drilling position; meanwhile, the filler is injected into the mud discharge space 41 of the roller bit 31 from the filler supply pipe 59A and into the open/close space 38, the opening 34, and the retraction space of the roller bit 31 in the ground from the protruding/retracting hole 37a of the holding cylinder 37. This can prevent soil or mud from entering the bit housing case 35 from the opening 34. Moreover, the gate plate 51 closes the opening surface 37b of the protruding/retracting hole 37a of the holding cylinder 37, and then the filler injected into the protruding/retracting hole 37a between the gate plate 51 and the roller bit 31 in the holding cylinder 37 is discharged from the filler discharge pipe 59B, allowing the protruding/retracting hole 37a to communicate with the working space 28 with a pressure reduced to an atmospheric pressure. Thus, the gate plate 51 is pressed to the opening surface 37b of the holding cylinder 37 by a pressure difference between a face collapse earth pressure at the front of the gate plate 51 and an atmospheric pressure at the rear of the gate plate 51. This compresses the water sealant 40 so as to effectively seal the protruding/retracting hole 37a at the front of the holding cylinder 37. Furthermore, the gate plate 51 can be opened or closed in a noncontact manner or slightly in contact with the front side of the holding cylinder 37. This can prevent damage on the water sealant 40 provided on the inner surface of the gate plate 51. Moreover, the gate plate 51 can be opened or closed with only a small amount of power.

The front surface of the holding cylinder 37 and the gate plate 51 are formed on the circular surface around the open/close shafts 52, thereby pivotally opening and closing the gate plate 51 about the open/close shafts 52. This configuration makes it possible to form the gate housing space 39 in the upper and lower parts and left and right sides of the holding cylinder 37 in the bit housing case 35, achieving the bit housing case 35 with a small configuration.

Moreover, the bearing body 64 supporting the open/close shafts 52 is supported by the movable support mechanism 61 so as to longitudinally move along the protruding/retracting axis Oa. Only with this configuration, the gate plate 51 can be effectively brought into contact with the opening surface 37b of the holding cylinder 37 by a pressure difference between a face collapse earth pressure and an atmospheric pressure, thereby closing the protruding/retracting hole 37a of the holding cylinder 37. When the gate plate 51 is opened or closed, the water sealant 40 does not strongly slide in contact with the gate plate 51. This can minimize damage to the water sealant 40 when the gate plate 51 is opened or closed.

Moreover, the urging support mechanism 62 fixes the open/close shafts 52 with the open/close shaft fixture 68 when the gate plate 51 is opened or closed. The fixed open/close shafts 52 are released with the closed gate plate 51, allowing the coil springs 67A and 67B to press the gate plate 51 to the opening surface 37b. The gate plate 51 can be pressed to the opening surface 37b of the holding cylinder 37 by the biasing force of the coil springs 67A and 67B and a pressure difference between a face collapse earth pressure and an atmospheric pressure. Thus, even if the pressure difference is small, the water sealant 40 can be effectively compressed so as to effectively seal the protruding/retracting hole 37a of the holding cylinder 37.

Moreover, according to the first to third driving support mechanisms 63A to 63C, the gate plate 51 is pressed to the opening surface 37b of the holding cylinder 37 by a pressure for mechanically pressing the gate plate 51 to the opening surface 37b of the holding cylinder 37 and a pressure difference between a face collapse earth pressure and an atmospheric pressure, thereby effectively sealing the protruding/retracting hole 37a of the holding cylinder 37. Thus, even if the pressure difference is small, the water sealant 40 can be effectively compressed so as to effectively seal the protruding/retracting hole 37a of the holding cylinder 37.

Since the roller bit 31 is used as a drilling bit, the worn roller bit 31 can be easily exchanged from the inside even during drilling on the considerably worn hard ground. Moreover, the filler supply pipe 59A and the filler discharge pipe 59B can be connected to the bit holder 42 that holds the disc cutters 44, by using the mud discharge space 41. This configuration makes it possible to effectively supply and discharge the filler and wash water and smoothly supply and discharge the filler to the retraction space of the roller bit 31. Furthermore, the filler can be easily washed with wash water.

The roller bit 31 in the present embodiment may be replaced with a fixed cutter bit.

The invention claimed is:

1. A bit exchange method for a shield tunneling machine in which a cutter head is supported at a front of a shield body so as to rotate around a shield axis, drilling bits are disposed on a front surface of the cutter head, and worn one of the drilling bits is exchanged from a working space provided in the cutter head, the method comprising:

retracting the drilling bit from a drilling position where the drilling bit is protruded forward from a front plate of the cutter head through an opening, to a protruding/retracting hole formed on a holding cylinder in a bit housing case on a back side of the front plate; meanwhile, injecting a filler from the drilling bit into a retraction space containing the retracted drilling bit, covering an opening surface of the holding cylinder by moving a gate plate so as to close an open/close space formed between the front plate and the opening surface of the holding cylinder in the bit housing case; and discharging the filler injected between the gate plate and the drilling bit in the protruding/retracting hole with a pressure reduced to an atmospheric pressure, allowing the gate plate to come into contact with an edge of the protruding/retracting hole at a front of the holding cylinder by a pressure difference between a face collapse earth pressure for pressing the gate plate from a front surface of the gate plate and an atmospheric pressure on a back side of the gate plate, and closing the protruding/retracting hole by pressing a sealant disposed between the edge of the protruding/retracting hole and the gate plate.

2. The bit exchange method for a shield tunneling machine according to claim 1, further comprising compressing the sealant by urging or retracting the gate plate backward with the pressure difference after closing the opening surface of the holding cylinder.

3. A bit exchange device for a shield tunneling machine in which a cutter head is supported at a front of a shield body so as to rotate around a shield axis, drilling bits are disposed on a front surface of the cutter head, and worn one of the drilling bits is exchanged from a working space provided in the cutter head, the bit exchange device comprising a bit housing case in the working space behind a back side of an opening formed on a front plate of the cutter head, the bit housing case covering the opening and including an insertion/removal opening where the drilling bit is insertable and removable on a back side of the bit housing case, the bit housing case comprising:

a holding cylinder disposed with an open/close space between the opening of the front plate and the holding cylinder, the holding cylinder having a protruding/retracting hole for holding the drilling bit in a protruding or retracting manner along a protruding/retracting axis;

a bit fixture capable of fixing the drilling bit in the protruding/retracting hole, at a drilling position where the drilling bit protrudes forward from the opening of the front plate;

a gate plate movable in the open/close space so as to open and close the protruding/retracting hole;

a water sealant disposed between the gate plate and an edge of the protruding/retracting hole, on a front surface of the holding cylinder; and a communicating hole formed on the drilling bit so as to supply a filler to a front of the drilling bit, wherein the filler is injected into a retraction space at the front of the drilling bit from the communicating hole [a (filler) supply/discharge pipe is omitted] of the drilling bit while the drilling bit is retracted into the holding cylinder from the drilling position; the filler between the gate plate and the drilling bit is discharged from the communicating hole in the protruding/retracting hole after the protruding/retracting hole is closed by the gate plate; a space between the gate plate and the drilling bit communicates with the working space with a pressure reduced to an atmospheric pressure; and the gate plate is pressed to the front surface of the holding cylinder by a pressure difference between a face collapse earth pressure of a front side of the gate plate and an atmospheric pressure on a back side of the gate plate, pressing the water sealant so as to close the protruding/retracting hole.

4. The bit exchange device for a shield tunneling machine according to claim 3, wherein the front surface of the holding cylinder and the gate plate are formed on a circular surface around an open/close axis perpendicular to the protruding/retracting axis behind the open/close space, and the bit exchange device further comprising a bearing body provided on at least one of two ends disposed along an open/close shaft direction, the bearing body rotationally supporting the gate plate via an open/close shaft, and a movable support mechanism provided to movably guide the bearing body along the protruding/retracting axis direction.

5. The bit exchange device for a shield tunneling machine according to claim 4, further comprising one of an urging support mechanism and a driving support mechanism, the urging support mechanism urging the bearing body backward along the protruding/retracting axis, the driving support mechanism driving the bearing body along the protruding/retracting axis direction.

6. The bit exchange device for a shield tunneling machine according to any one of claims 3 to 5, wherein the drilling bit is a roller bit including a disc cutter rotationally supported by a bit holder, and the communicating hole formed on the bit holder is selectively connected to a mud discharge pipe for discharging mud drilled by the roller bit and a filler supply/discharge pipe capable of supplying and discharging the filler.

* * * * *